United States Patent [19]

Block et al.

[11] 4,163,254

[45] Jul. 31, 1979

[54] METHOD AND SYSTEM FOR SUBSCRIPTION TELEVISION BILLING AND ACCESS

[76] Inventors: Robert S. Block, 8620 N. Pelham Pkwy., Milwaukee, Wis. 53217; John R. Martin, 3129 W. Mill Rd., Milwaukee, Wis. 53209

[21] Appl. No.: 768,404

[22] Filed: Feb. 14, 1977

[51] Int. Cl.² .......................... H04N 7/16; H04N 7/00
[52] U.S. Cl. ...................................... 358/122; 358/84; 358/123; 358/124
[58] Field of Search .................... 358/85, 86, 122, 123, 358/124, 114, 84

[56] References Cited

U.S. PATENT DOCUMENTS

| | | | |
|---|---|---|---|
| 3,427,402 | 2/1969 | Stokes | 179/5 P |
| 3,733,430 | 5/1973 | Thompson et al. | 358/84 |
| 3,824,332 | 7/1974 | Horowitz | 358/124 |
| 3,919,462 | 11/1975 | Hartung et al. | 358/117 |
| 4,024,574 | 5/1977 | Nieson | 358/124 |
| 4,025,948 | 5/1977 | Loshin | 358/124 |
| 4,044,376 | 8/1977 | Porter | 358/84 |
| 4,068,264 | 1/1968 | Pires | 358/124 |

*Primary Examiner*—S. C. Buczinski
*Attorney, Agent, or Firm*—Burns, Doane, Swecker & Mathis

[57] ABSTRACT

A subscription television system and method in which billing information regarding programs actually viewed by a subscriber of the system is accumulated over non-dedicated telephone lines. A scrambled television program signal containing a block of television program material and a program identification code unique to the block of program material is transmitted at a predetermined carrier frequency. The codes are preferably included in the vertical retrace interval of the video portion of the program signal and the transmitted program signal is selectively received at a subscriber station and selectively unscrambled to permit viewing of the block of program material being transmitted in response to subscriber action indicating acceptance for viewing of the block of program material. The program identification code in the program signal received at the subscriber station is detected and stored for subsequent transmission as an electrical signal in response to the subscriber action indicating acceptance for viewing of the block of program material.

The program identification code stored at the subscriber station is selectively accessed from a remote location over telephone lines on other than a real time basis (e.g., a periodic basis) to thereby provide billing information at the remote location as to programs actually viewed by the subscriber. The subscriber can thus be billed monthly or on some desired periodic basis for programs actually viewed during the preceding period.

14 Claims, 4 Drawing Figures

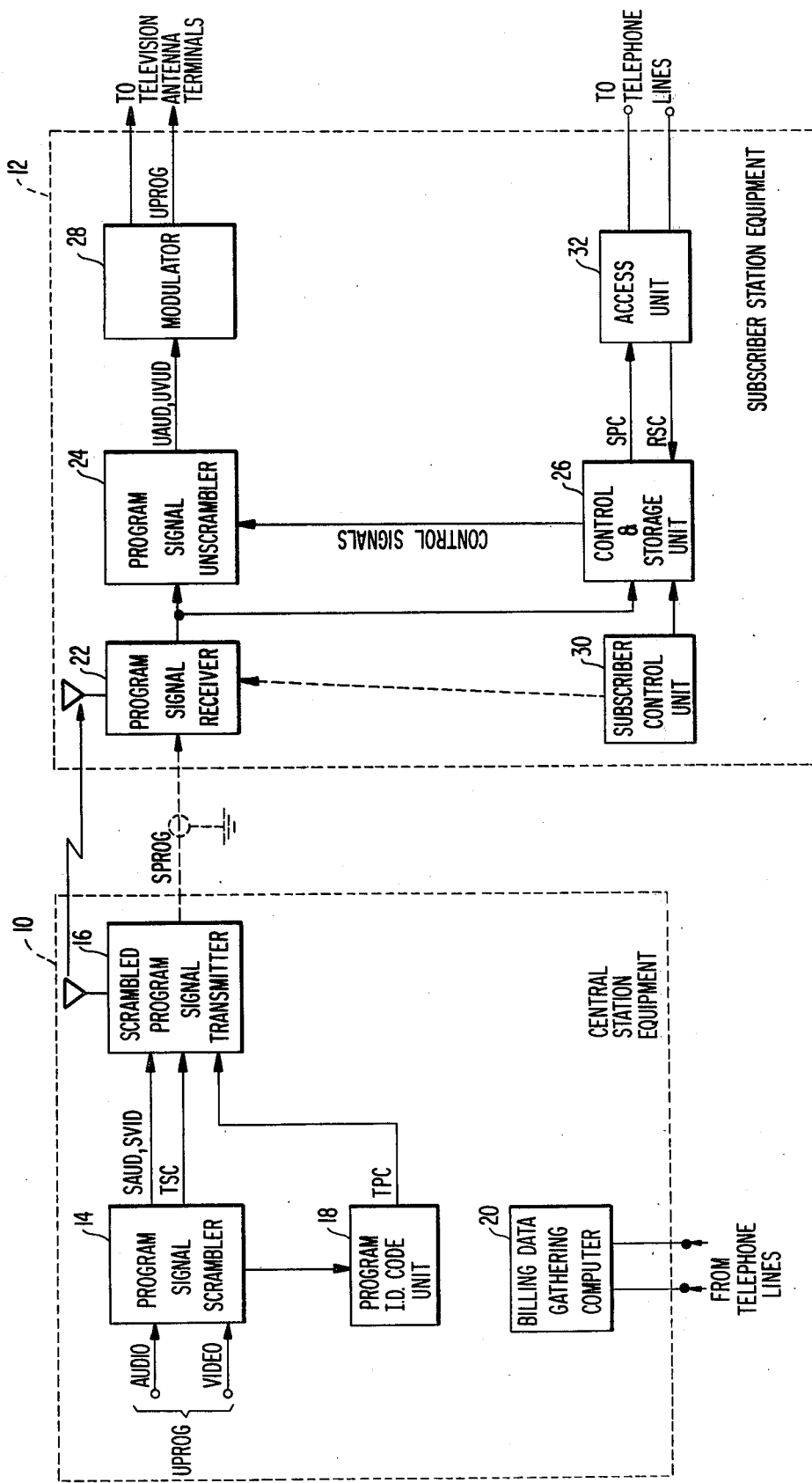

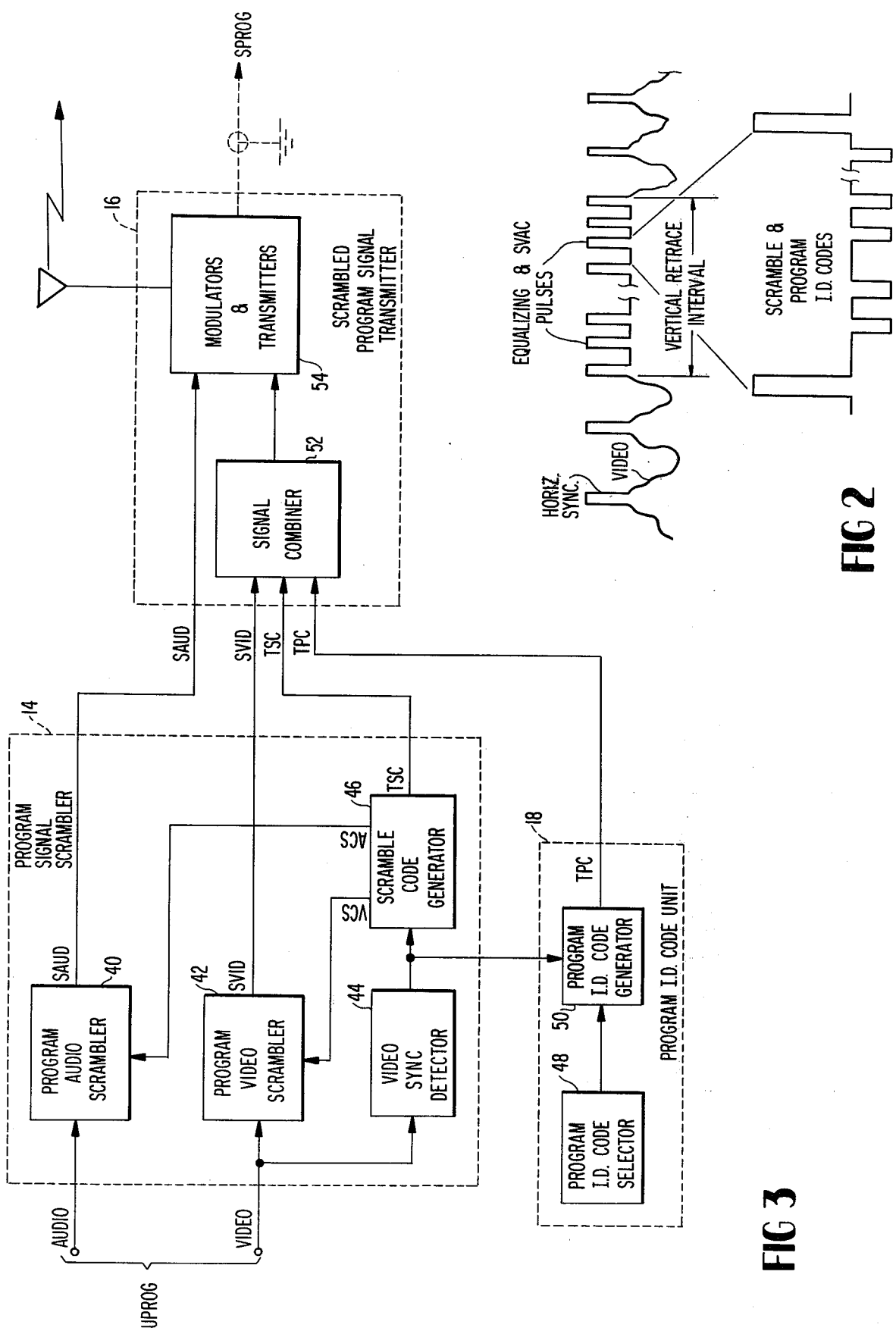

METHOD AND SYSTEM FOR SUBSCRIPTION TELEVISION BILLING AND ACCESS

BACKGROUND OF THE INVENTION

The present invention relates to subscription television and more particularly to a method and system for obtaining billing information regarding programs viewed by a subscriber of a subscription television system.

Since the advent of subscription or pay television, numerous techniques have been devised to bill the subscribers for the services provided. It has been suggested that the subscriber pay for subscription television services on a fixed charge basis, a uniform cost per unit use basis, or on a per program charge basis. More recent systems have adopted the per program charge basis for billing.

It will be appreciated that a fixed charge or uniform charge per unit basis of billing presents the least problems with regard to recording and calculating billing charges. With a fixed charge system as is used with most cable television or CATV systems, the station operator merely bills the subscriber a fixed amount on a monthly basis.

The uniform per unit use billing involves somewhat more complex procedures since actual viewing time must be recorded and somehow made available to the operator for billing purposes. Moreover, the viewing time must be registered in conjunction with the identity of each subscriber so that an individual subscriber can be billed for his viewing time.

The most complex billing system and yet the most desirable from the standpoint of the subscriber is billing on the basis of actual programs viewed with different charges for different programs. In such a system, the billing entity must know both the identity of the subscriber and the identity of the programs viewed during a billing period.

Several billing systems have been developed in order to charge subscribers to a pay television system on the basis of programs actually viewed. Typical of these types of systems are the coinbox systems that are exemplified by U.S. Pat. No. 3,021,383. In such a system, the subscriber must deposit a certain amount of money in a coinbox attached to the receiver in order to view a particular program. Different programs may be assigned different charges so that, for example, a particular movie may cost less to view than a sporting event. With such a system, payment for the program enables the viewing of a program and payment is thus assured. However, the billing entity (the system operator) must collect the money from the coinboxes on a periodic basis, requiring considerable manpower and also requiring access to the subscriber's home.

Another approach to billing on a per program basis requires the subscriber to place a telephone call to some central location and request the receipt of a particular program. The calling subscriber's equipment is then enabled and charges for the program can be recorded and billed to the calling subscriber. It will be appreciated that such a system may encounter difficulites in large service areas with a large number of subscribers. In addition, the subscribers's telephone must be utilized frequently for this purpose.

Other approaches to the billing problem in pay TV systems include the one of cards or paper tapes that are used at the subscriber location to record viewing information. In a particular system, a card is mailed to the subscriber and is required for operation of the subscriber's receiver. The card is punched or otherwise imprinted at the subscriber location to record program charges and must be mailed or otherwise transmitted to the system operator so that charges may be assessed. Typical of these types of systems are those shown in U.S. Pat. Nos. 3,470,309, 3,475,547 and 3,531,583.

Another type of billing system may be characterized as a real time metering or interrogating system such as that shown in U.S. Pat. Nos. 3,396,232, 3,716,654 and 3,733,430. These systems typically interrogate the receivers or otherwise monitor the status of the receivers on a program by program basis (e.g., through the use of special transducers) to determine if the subscriber is watching a particular program. This information can then be used for billing purposes as well as audience survey purposes and the like.

It can be seen that the foregoing systems suffer from numerous deficiencies including system complexity, enormous time consumption, reliance on subscriber action to receive billing information, and the like. It is accordingly an object of the present invention to obviate the foregoing and other deficiencies of the prior art pay television system billing procedures through the use of a novel method and system for billing on a per program basis with a minimum of complex equipment and a minimum of human intervention.

It is another object of the present invention to provide a novel method and system for obtaining billing information regarding programs actually viewed by a subscriber of a pay television system wherein program identification data is recorded and is accessed on a periodic basis from a central location, thus, eliminating the need for the gathering of the information through the intervention of the system subscriber.

It is yet another object of the present invention to provide a novel method and system for obtaining billing information regarding programs actually viewed by a pay television system subscriber which utilizes a minimum of complex equipment and makes use of existing equipment at the subscriber location including a telephone at the location.

It is a further object of the present invention to provide a novel subscriber television system and method in which scramble and program codes are received in the program video signal and are used in conjunction with a telephone access unit to unscramble the received program signal and record program viewing under the control of a central station linked to the access unit over non-dedicated telephone lines.

These and other objects and advantages of the present invention will become apparent to one skilled in the art to which the invention pertains from the following detailed description when read in conjunction with the appended drawings.

BRIEF DESCRIPTION OF THE DRAWINGS

FIG. 1 is a functional block diagram illustrating a subscription or pay television system in accordance with the present invention;

FIG. 2 is a signal diagram illustrating an exemplary form of the video portion of the program signal with scramble and program ID codes as utilized in the system of FIG. 1;

FIG. 3 is a functional block diagram illustrating the central transmitting station of FIG. 1 in greater detail; and, FIG. 4 is a functional block diagram illustrating the subscriber station equipment of FIG. 1 in greater detail.

DETAILED DESCRIPTION

Figure 4:
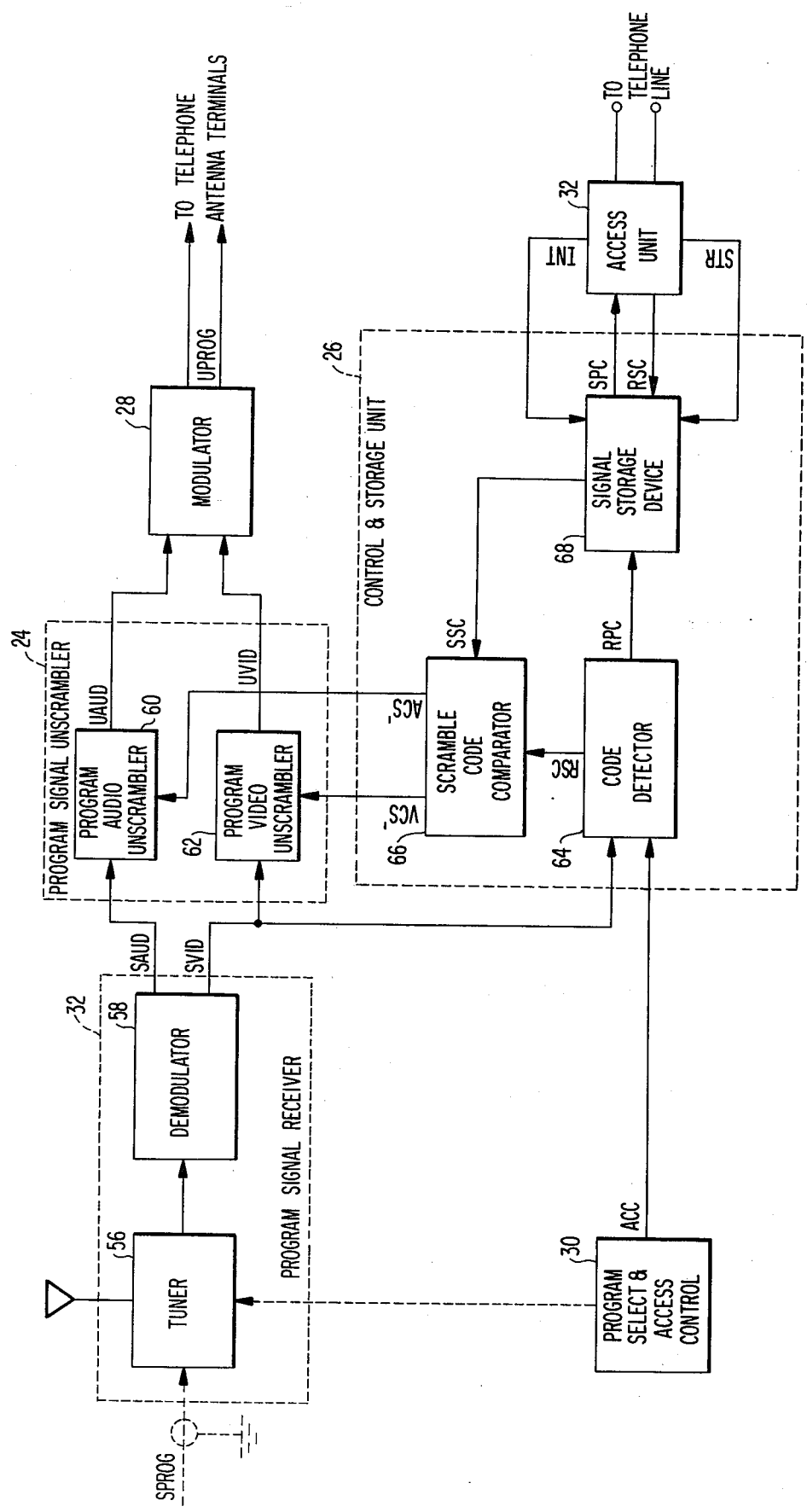

Referring now to FIG. 1, the system according to the present invention generally comprises central station equipment 10 which supplies program signals in a scrambled form to subscriber station equipment 12 at each of the subscriber stations. As will be described hereinafter in greater detail, the scrambled program signal includes scrambled audio and video signals as well as various synchronizing signals and codes. The scrambled program signal SPROG is supplied to the subscribers either by conventional broadcast or cable techniques.

The audio and video signals from a conventional source such as television camera equipment are applied to a program signal scrambler 14 to produce respective scrambled audio and video signals SAUD and SVID. In addition, the program signal scrambler 14 provides a transmitted scramble code TSC for transmission with the scrambled program audio and video signals. The SAUD, SVID and TSC signals from the scrambler 14 are provided to a suitable conventional transmitter 16 for production of a scrambled program signal that includes the code signals and for transmission to subscriber stations.

A program ID code unit 18 synchronized with the scrambled video signal and scramble code provides a program code TPC for transmission with the program signals. This program ID code TPC is combined with the scrambled program video and the scramble code for transmission to the subscriber as is described hereinafter in greater detail. In addition, the central station equipment 10 may include a billing data gathering computer 20. It should however be understood that the billing data gathering computer 20 may be located at any convenient central location and need not be located at the transmitting site.

The scrambled program signal SPROG from the central station equipment 10 is received by a program signal receiver 22 at the subscriber station and the received signal is supplied both to a program signal unscrambler 24 and to a control and storage unit 26. The program signal unscrambler 24 operates in response to control signals from the control and storage unit 26 to unscramble the incoming program signal and provide unscrambled audio and video signals UAUD and UVID to a conventional modulator 28. The modulator 28 modulates a carrier signal of an appropriate carrier frequency with the unscrambled audio and video signals and supplies the unscrambled program signal in the form of a modulated carrier wave to the television antenna terminals for use by the subscriber's television set in a conventional manner.

A subscriber control unit 30 provides subscriber control of program viewing. The subscriber control unit 30 may, for example, include one or more subscriber manipulated controls which permit the subscriber to selectively tune a conventional tuner in the program signal receiver 22 in order to select a desired program as well as to provide appropriate signals to the control and storage unit 26 indicating that the subscriber has selected a program for viewing and has thus assumed the obligation to pay that program.

The control and storage unit 26 detects code signals in the incoming scrambled program signal for unscrambling and billing purposes. In this respect, the transmitted scrambled code TSC is detected by the control and storage unit 26 and compared to a received scramble code RSC supplied to the control and storage unit through an access unit 32 and stored in the control and storage unit. The control and storage unit 26 also detects the transmitted program code TPC in the incoming program signal and stores the program code of a particular program being viewed. The stored program code SPC is then supplied on command to the access unit 32. As illustrated, the access unit 32 is connected to telephone lines which are in turn connectable through conventional telephone switching equipment to the telephone lines leading to the billing data gathering computer 20.

In operation, the audio and video program signals are supplied to the program signal scrambler 14 and are scrambled in any suitable conventional manner. For example, these signals may be scrambled in accordance with the techniques described in U.S. Pat. No. 3,824,332 through selective inversion of portions of the video signal. The scramble code TSC may be inserted into the video signal in order to permit unscrambling of the program signals at the subscriber station as is set forth in U.S. Pat. No. 3,824,332.

In addition, each program that is transmitted in a scrambled form may be identified by placing a program code TPC in the video signal during the vertical retrace interval of the signal or at any other convenient location. In this connection, the program code and scramble code may be combined with the program video at the appropriate locations by synchronizing the generation of these codes with the video synchronizing signals in any known manner such as that shown in the reference U.S. Pat. No. 3,824,332.

The program signal transmitter 16 combines the video and code signals and transmits this combined signal together with the audio signal at an appropriate carrier frequency. The resultant video portion of the program signal may thus take the form illustrated in FIG. 2. For example, as is illustrated in FIG. 2, the successive horizontal lines of the video signal are conventionally separated by horizontal synchronization pulses and each frame of video signals is separated by a vertical retrace interval or vertical synchronization signal. During the vertical retrace interval, various equalizing and synchronization pulses are provided and it is in this interval that the scramble and program ID codes are preferably combined with the transmitted program signal. These codes are preferably encoded in a digital form as illustrated in FIG. 2 although it should be understood that any well known coding technique such as the tone burst technique described in U.S. Pat. No. 3,824,332 may be utilized.

With continued reference to FIGS. 1 and 2, the transmitted program video signal is thus in the form of a scrambled signal (e.g., with selected frames of video information inverted) with codes inserted at appropriate locations to identify the program being transmitted and to indicate to the subscriber equipment the state of the subsequent video signal (i.e., inverted or non-inverted). The program signal receiver 22 selects a particular carrier frequency through the use of a conventional tuner and demodulates the incoming program signal to recover the audio, video and code signals.

The recovered scrambled program signal is supplied to the program signal unscrambler 24 and to the control and storage unit 26 for unscrambling and detection of the codes contained in the video portion of the program signal. The scramble codes detected in the program signal are used to generate the control signals that control the unscrambling of the program signal by the unscrambler 24. The program code in the incoming video signal is stored in a storage unit that may be selectively accessed by an access unit 32. The access unit 32 may be, for example, of the type disclosed in copending U.S. patent applications Ser. No. 683,161 filed May 4, 1976 and Ser. No. 701,033 filed June 29, 1976, both by Robert S. Block and John R. Martin.

It will be appreciated that the invention provides a relatively simple manner of subscriber billing that allows for the identification of programs actually viewed and the rapid gathering of this information on a periodic basis long after a program has been viewed. Each subscriber station is selectively accessed so that program viewing information in association with subscriber identification information is available at a central location for billing purposes. Moreover, the billing gathering computer 20 has complete control over the subscriber station equipment 12 in the sense that it can deny new scramble codes to the subscriber station equipment on a selective basis if that particular subscriber has not paid his bill or for other relevant reasons.

To facilitate an understanding of the present invention, the central station equipment 10 and the subscriber equipment 12 are illustrated in greater detail in FIGS. 3 and 4, respectively.

Referring to FIG. 3, the central station equipment receives the unscrambled program signal UPROG including the audio and video portions. The audio portion is applied to a program audio scrambler 40 and the video portion is applied to both a program video scrambler 42 and to a video sync detector 44. The video sync detector 44 detects an appropriate synchronization pulse in the video signal, e.g., the vertical sync pulses, and supplies the sync pulse to a scramble code generator 46 and to the program ID code unit 18. The scramble code generator 46 supplies a video scramble control signal VCS to the program video scrambler 42 and an audio scramble control signal ACS to the program audio scrambler 40. The program signal is thus scrambled to produce a scrambled audio signal SAUD and a scrambled video signal SVID in a conventional manner. In addition, the scramble code TSC is generated by the scramble code generator 46 so as to identify the manner in which the program signal has been scrambled.

As was previously mentioned, the program ID code unit 18 receives the sync signal from the video sync detector 44 and generates the program code signal TPC. In this connection, a program ID code selector 48 may be provided to control the generation of a particular program code by a program ID code generator 50. Thus, the station operator can select a particular code for a particular program in this manner.

The scrambled audio and video signals together with the scrambled code and program code are supplied to the scrambled program signal transmitter 16 comprising a signal combiner 52 and conventional modulators and transmitters 54. The signal combiner 52 receives the scrambled video, scramble code and program code signals and combines these signals in a conventional manner to produce a signal such as that illustrated in FIG. 2. This combined signal is then applied to the modulators and transmitters 54 together with the scrambled audio signal for modulation of these signals onto a suitable carrier wave for transmission.

It will thus be appreciated from the diagram of FIG. 3 that the video sync detector 44 detects the appropriate synchronization pulse in the video signal in order to trigger the scramble code generator 46 and the program ID code generator 50 at appropriate times. For example, the video sync detector 44 preferably detects the vertical sync pulse during the vertical retrace interval of the video signal. This vertical sync pulse triggers the scramble code generator 46 in order to cause the program video signal to be inverted or passed uninverted at an appropriate time. In addition, the detected sync signal triggers the scramble code generator and the program ID code generator in order to synchronize the generation of the scramble code and program code signals TSC and TPC with the occurrence of the vertical retrace interval. The audio scramble control signal ACS generated by the scramble code generator 46 may be any suitable control signal and need not be synchronized to the video synchronization pulses.

The signal combiner 52 conventionally combines the video and code signals and the modulators and transmitters 54 provide appropriate modulated signals for either broadcast or cable transmission.

Referring now to FIG. 4, the program signal receiver 32 at the subscriber station may include a conventional tuner 56 and a conventional demodulator 58. The scrambled program signal is supplied to the tuner 56 and to the demodulator 58 for recovery of the scrambled audio and scrambled video signals. The scrambled video signal, of course, contains the program and scramble codes in addition to video information. Control of the tuner 56 and thus selection of a particular carrier frequency may be accomplished in a conventional manner by a control knob on the subscriber control unit 30. The control unit 30 may therefore be referred to as a program select and accept control since this control also may provide for the application of an accept signal ACC to the control and storage unit 26 as an indication that the subscriber has assumed the obligation to pay for a particular program to which the equipment is tuned.

The scrambled audio signal is supplied to a program audio unscrambler 60 and the scrambled video signal is supplied both to a program video unscrambler 62 and to a code detector 64 in the control and storage unit 26. The code detector 64, when enabled by the accept signal ACC, detects the received scramble code RSC and the received program code in the video signal. The received scrambled code is supplied to a scramble code comparator 66 and the received program code is supplied to a conventional signal storage device 68 for storage and later recall by the access unit 32.

The scramble code comparator 66 receives a stored scramble code signal SSC from the signal storage device 68 and generates the video and audio unscramble control signals VCS' and ACS', respectively. These two signals are supplied to the respective program video unscrambler 62 and the program audio unscrambler 60 in order to reconstitute the scrambled video and audio signals to their original form prior to scrambling by the program signal scrambler 14 at the central station equipment. This unscrambling process may take the form, for example, of that illustrated and described in previously referenced U.S. Pat. No. 3,824,332. Thus, for example, when the received scramble code RSC is compared to the stored scramble code SSC and is identified as an invert signal, the VCS' signal causes the program video unscrambler 62 to invert the subsequent frame of video signals. Similarly, when the received scramble code is compared with the stored scramble code and is identified as a non-invert signal, the video signal is passed by the program video unscrambler 62 in an uninverted form.

The access unit 32 is connected to the telephone lines as was previously described and provides access between the billing data gathering computer 20 and the signal storage device 68. The subscriber station equipment may be accessed in any one of the various ways disclosed in the previously referenced copending patent applications of Block and Martin such as through the timed placement of a call from the access unit 32 to the computer 20 (e.g., the placement of a call on a monthly basis). Similarly, when the signal storage device 68 is full and can store no more program codes, the access unit 32 may place a call to the data gathering computer 20 to transfer billing information thereto.

In this connection, the computer 20 and access unit 32 may be connected over the telephone lines through conventional telephone switching equipment as commanded either from the access unit 32 or from the computer 20. After the connection is effected between the computer 20 and the access unit 32, various data may be transmitted over the telephone lines.

The computer 20 may, for example, initially command the access unit 32 to transmit the stored program code signals SPC from the signal storage device 68 to the computer 20. This may be accomplished in any suitable manner as, for example, by sending a code to the access unit 32 and generating an interrogate or read signal INT which causes the signal storage device 68 to supply the stored program codes SPC to the telephone lines and therefore to the computer 20. Similarly, the computer 20 may transmit a code to the access unit 32 commanding it to generate a strobe or right signal STR in order to transmit new scramble codes RSC through the access unit to the signal storage device 68. During normal operation, then, the signal storage device may be supplied with scramble codes for one month's programs and at the end of that month new scramble codes may be supplied for the next month's programming. At the same time, the program codes stored in the signal storage device 68 may be accessed and transferred to the computer 20 so that the subscriber may be billed for actual programs viewed during the preceding month at various rates for various programs.

From the foregoing description, it will be made clear that the present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A billing system for obtaining billing information regarding programs actually viewed by a subscriber of a pay television system comprising:
   means for transmitting at a predetermined carrier frequency a scrambled television program signal containing a block of television program material and an identification code unique to the block of program material being transmitted;
   means at a subscriber station for selectively receiving the transmitted program signal and for selectively unscrambling the program signal to permit viewing of the block of program material being transmitted in response to subscriber action indicating acceptance for viewing of the block of program material;
   means for detecting the identification code in the program signal received at the subscriber station and for temporarily storing a program identification code for subsequent transmission as an electrical signal in response to the detected identification code and to the subscriber action indicating acceptance for viewing of the block of program material; and
   means connected to said detecting and storing means for selectively accessing the program identification code stored at the subscriber station on other than a real time basis and for transmitting the stored program identification signal to a remote location in response to a command signal received from the remote location to thereby provide billing information at the remote location as to programs actually viewed by the subscriber.

2. The billing system of claim 1 wherein the program identification code is transmitted in a video portion of the scrambled program signal during a vertical retrace interval.

3. The billing system of claim 1 including a computer at the remote location for selectively establishing a communication link between the accessing means and the remote location and for generating said command signals to effect the transmission of said stored program identification signals.

4. The billing system of claim 3 wherein the communication link is established over non-dedicated telephone lines.

5. The billing system of claim 4 wherein the program identification code is transmitted in a video portion of the scrambled program signal during a vertical retrace interval.

6. A billing system for obtaining billing information regarding programs actually viewed by a subscriber of a pay television system comprising:
   means for transmitting at a predetermined carrier frequency a scrambled television program signal containing a block of television program material and an identification code unique to the block of program material being transmitted;
   means at a subscriber station for selectively receiving the transmitted program signal and for selectively unscrambling the program signal to permit viewing of the block of program material being transmitted in response to subscriber action indicating acceptance for viewing of the block of program material;
   means for detecting the identification code in the program signal received at the subscriber station and for temporarily storing a program identification code for subsequent transmission as an electrical signal in response to the detected identification code and to the subscriber action indicating acceptance for viewing of the block of program material; and
   means for selectively applying the stored program identification signal to non-dedicated telephone lines on a periodic basis unrelated to the transmission of a particular program signal for transmission of the stored program identification signal to a central location in response to the receipt of a predetermined command signal by said applying means over said non-dedicated 7. The billing system of claim 6 wherein the program identification code is transmitted in a video portion of the scrambled program signal during a vertical retrace interval.

8. A method for billing a subscriber of a pay television system for programs actually viewed by the subscriber at a subscriber station comprising the steps of:
- transmitting at a predetermined carrier frequency a scrambled television program signal that includes an identification code unique to a block of program material being transmitted;
- selectively receiving the transmitted program signal at the subscriber station and selectively unscrambling the received signal in response to subscriber action indicating acceptance for viewing of the block of program material;
- detecting the identification code in the program signal received at the subscriber station and temporarily storing a program identification code for billing purposes in response to the action of the subscriber indicating acceptance for viewing of the block of program material being received;
- selectively accessing the subscriber station from a remote location to obtain access to each program identification code stored at the subscriber station; and
- billing the subscriber in accordance with the stored program identification codes accessed from the remote location.

9. A method for billing a subscriber of a pay television system for programs actually viewed by the subscriber at a subscriber station comprising the steps of:
- receiving at a predetermined carrier frequency a scrambled television program signal that includes an identification code unique to a block of program material;
- selectively unscrambling the received signal in response to subscriber action indicating acceptance for viewing of the block of program material;
- detecting the identification code in the program signal received at the subscriber station and storing a program identification code in response to the action of the subscriber indicating acceptance for viewing of the block of program material being received;
- selectively connecting the subscriber station to a remote location over non-dedicated telephone lines on a periodic basis unrelated to the receiving of the scrambled program signal;
- selectively transmitting each program identification code stored at the subscriber station to the remote location in response to a command signal transmitted from the remote location over the non-dedicated telephone lines; and
- billing the subscriber in accordance with the stored program identification codes transmitted to the remote location.

10. The method of claim 9 wherein the program identification code is received and detected in a portion of the scrambled program signal during a vertical retrace interval.

11. In a pay television system in which television program signals are transmitted to subscribers in a scrambled form and the subscribers are billed a per program charge for programs viewed, a subscriber billing system comprising:
- means at a location remote from the subscriber location for inserting a program identifying signal into the scrambled program signal for transmission thereof with the program signal;
- means at the subscriber location for receiving the scrambled program signal, including the program identifying signal;
- means at the subscriber location for generating an accept signal indicating acceptance of a program signal for viewing by the subscriber; and,
- memory means at the subscriber location for storing a billing signal that identifies the program accepted for viewing in response to both the received program identifying signal and the accept signal, billing signals identifying the programs accepted for viewing thereby being stored at the subscriber location for subsequent retrieval in order to bill the subscribers on the basis a per program charge for programs accepted for viewing.

12. The system of claim 11 including means at the subscriber location responsive to both the received program identifying signal and the accept signal for unscrambling the received scrambled program signal.

13. The system of claim 11 wherein the scrambled program signal and the program identifying signal are broadcast from the remote location with the program identifying signal contained in a vertical retrace interval of the program signal, the system including means at the subscriber location for detecting and storing the program identifying signal in the received broadcast signal in response to said accept signal and means for unscrambling the program signal in the received broadcast signal upon storing of the program identifying signal.

14. The system of claim 13 including means connected to nondedicated telephone lines at the subscriber location and at the remote location to access the stored program identifying signal at the subscriber station and transmit the accessed program identifying signal to the remote location for billing purposes.

* * * * *